(12) United States Patent
De Villele et al.

(10) Patent No.: US 10,388,170 B2
(45) Date of Patent: Aug. 20, 2019

(54) SPEED-CONSTRAINED FLIGHT MANAGEMENT METHODS AND SYSTEMS

(71) Applicant: HONEYWELL INTERNATIONAL INC., Morris Plains, NJ (US)

(72) Inventors: Dorothee De Villele, Haute-Garonne (FR); Michal Polansky, South Moravia (CZ); Marek Batelka, Tisnov (CZ); Laurent Villacampa, Toulouse (FR)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 37 days.

(21) Appl. No.: 15/676,003

(22) Filed: Aug. 14, 2017

(65) Prior Publication Data

US 2019/0051189 A1 Feb. 14, 2019

(51) Int. Cl.
*G08G 5/00* (2006.01)
*G01C 21/34* (2006.01)
(Continued)

(52) U.S. Cl.
CPC ........... *G08G 5/0052* (2013.01); *G01C 21/00* (2013.01); *G01C 21/14* (2013.01); *G01C 21/20* (2013.01); *G01C 21/3492* (2013.01); *G01C 23/00* (2013.01); *G05D 1/0607* (2013.01); *G08G 5/0021* (2013.01); *G08G 5/0034* (2013.01)

(58) Field of Classification Search
CPC .... G08G 5/0052; G08G 5/0021; G01C 21/14; G01C 21/3492
See application file for complete search history.

(56) References Cited

U.S. PATENT DOCUMENTS

| 6,507,782 B1 | 1/2003 | Rumbo et al. |
| 8,010,267 B2 | 8/2011 | Klooster et al. |

(Continued)

FOREIGN PATENT DOCUMENTS

| EP | 2426567 A1 | 3/2012 |
| WO | 02093281 A1 | 11/2002 |
| WO | 2015/140496 A1 | 9/2015 |

OTHER PUBLICATIONS

Extended European Search Report for Application No. 18188113.7 dated Jan. 18, 2019.

*Primary Examiner* — Calvin Cheung
(74) *Attorney, Agent, or Firm* — Lorenz & Kopf, LLP

(57) ABSTRACT

Systems and methods are provided for managing speed-constrained vehicle operations. One exemplary method of operating an aircraft involves identifying a speed constraint associated with a navigational reference point, determining a speed envelope region en route to the navigational reference point based at least in part on the first speed constraint, identifying a target speed en route to the navigational reference point, and determining a speed profile for autonomously operations en route to the navigational reference point within the speed envelope region. The speed profile intersects the target speed within the speed envelope region and a slope of the speed profile is influenced by the target speed, for example, to effectuate or approximate the target speed by increasing the duration of time operation at or around the target speed is achieved. In one or more embodiments, multiple different target speeds associated with different flight levels or operating regions are accounted for.

19 Claims, 6 Drawing Sheets

(51) Int. Cl.
  *G01C 21/14* (2006.01)
  *G01C 21/00* (2006.01)
  *G01C 21/20* (2006.01)
  *G01C 23/00* (2006.01)
  *G05D 1/06* (2006.01)

(56) References Cited

U.S. PATENT DOCUMENTS

| | | | |
|---|---|---|---|
| 8,150,565 B2 | 4/2012 | Wachenheim et al. | |
| 8,180,506 B2 | 5/2012 | Sacle et al. | |
| 8,321,071 B2 | 11/2012 | Klooster | |
| 8,332,145 B2 * | 12/2012 | Dacre-Wright | G05D 1/101 701/3 |
| 8,340,843 B2 * | 12/2012 | Coulmeau | G08G 5/0043 701/14 |
| 8,386,097 B2 | 2/2013 | de Menorval et al. | |
| 8,406,939 B2 * | 3/2013 | Jackson | G05D 1/101 701/120 |
| 8,473,120 B2 * | 6/2013 | Blanchon | G05D 1/0005 701/3 |
| 8,788,189 B2 | 7/2014 | Polansky et al. | |
| 8,793,040 B2 | 7/2014 | Guedes et al. | |
| 9,043,051 B1 | 5/2015 | Barber | |
| 9,536,435 B1 | 1/2017 | Shay | |
| 9,540,005 B1 | 1/2017 | Howe-Veenstra et al. | |
| 9,564,056 B1 | 2/2017 | Ghaemi et al. | |
| 9,625,261 B2 | 4/2017 | Polansky et al. | |
| 10,013,236 B2 * | 7/2018 | Bailey | G05D 1/101 |
| 10,086,948 B2 * | 10/2018 | Gallo Olalla | G05D 1/0005 |
| 2005/0283281 A1 | 12/2005 | Hartmann et al. | |
| 2006/0025898 A1 | 2/2006 | Charles | |
| 2009/0259351 A1 | 10/2009 | Wachenheim et al. | |
| 2010/0125382 A1 | 5/2010 | Wachenheim et al. | |
| 2010/0131124 A1 * | 5/2010 | Klooster | G08G 5/0052 701/3 |
| 2010/0217459 A1 * | 8/2010 | Caillaud | G05D 1/0005 701/3 |
| 2011/0118908 A1 * | 5/2011 | Boorman | G08G 5/0021 701/14 |
| 2011/0295501 A1 | 12/2011 | Gutierez-Castaneda et al. | |
| 2014/0067245 A1 * | 3/2014 | Polansky | G05D 1/0202 701/121 |
| 2014/0121932 A1 | 5/2014 | Zeng | |
| 2015/0151849 A1 | 6/2015 | Labastie et al. | |
| 2015/0268048 A1 | 9/2015 | Seastrand et al. | |
| 2016/0069688 A1 * | 3/2016 | Polansky | G05D 1/0005 701/3 |
| 2016/0085239 A1 * | 3/2016 | Boyer | G08G 5/0021 701/5 |
| 2017/0004713 A1 | 1/2017 | Claybrough et al. | |

* cited by examiner

SPEED-CONSTRAINED FLIGHT MANAGEMENT METHODS AND SYSTEMS

TECHNICAL FIELD

The subject matter described herein relates generally to vehicle systems, and more particularly, embodiments of the subject matter relate to managing aircraft operations in connection with speed constraints.

BACKGROUND

In order to handle the expected increases in air traffic and congestion, the Next Generation Air Transportation System (NextGen) will introduce aircraft trajectory-based operations that require aircraft to follow custom-made so-called four-dimensional (4D) trajectories consisting of a specified path along-path time conformance requirements. This promotes prescribing and accurately following trajectories that ensure separation and optimize traffic flow management over different time horizons, which will significantly improve flight safety and performance. Thus, required time of arrival (RTA) and speed constraints are introduced to help guarantee the reliability of time of arrival at a particular waypoint to manage spacing between aircraft, minimize delays, and the like.

However, the RTA constraints, speed constraints and other altitude-based speed restrictions that may be provided by airport procedures, air traffic control (ATC), or the like typically do not account for operating costs. For example, the particular cost function utilized by a particular aircraft operator may define an optimum speed for achieving a desired cost index given the particular altitude of the aircraft and potentially other factors (e.g., the current fuel remaining or aircraft weight, current meteorological conditions, and the like). Accordingly, it is desirable to provide a system and method for managing speed constraints or other constraints pertaining to temporal operations in a manner that accounts for operating costs. Other desirable features and characteristics will become apparent from the subsequent detailed description and the appended claims, taken in conjunction with the accompanying drawings and the foregoing technical field and background.

BRIEF SUMMARY

Vehicle systems and related operating methods are provided. In one embodiment, a computer-implemented method of operating a vehicle is provided. The method involves identifying a first speed constraint associated with a navigational reference point, determining a speed envelope region en route to the navigational reference point based at least in part on the first speed constraint and a maximum acceleration of the vehicle, identifying a target speed en route to the navigational reference point, and determining a speed profile for travel en route to the navigational reference point within the speed envelope region. The speed profile intersects the target speed within the speed envelope region and a slope of the speed profile is influenced by the target speed, and the vehicle is autonomously operated in accordance with the speed profile.

In another embodiment, a method of operating an aircraft is provided. The method involves a flight management system (FMS) onboard the aircraft identifying one of an AT speed constraint and an AT OR ABOVE speed constraint associated with a navigational reference point of a flight plan, determining a speed envelope region in advance of the navigational reference point based at least in part on a maximum acceleration of the aircraft and the one of the AT speed constraint and the AT OR ABOVE speed constraint, identifying a target speed en route to the navigational reference point, and determining a speed profile that intersects the target speed within the speed envelope region. A slope of the speed profile is influenced by the target speed, and the aircraft is autonomously operated in accordance with the speed profile.

An embodiment of an aircraft system is also provided. The aircraft system includes a data storage element maintaining procedure information associated with an aircraft action, wherein the procedure information includes a navigational reference point having a speed constraint associated therewith, an input device to receive an input value, and a processing system coupled to the data storage element and the input device to determine a speed envelope region en route to the navigational reference point based at least in part on the speed constraint, identify a target speed corresponding to the input value, determine a speed profile intersecting the target speed within the speed envelope region, and autonomously operating an aircraft in accordance with the speed profile, wherein a slope of the speed profile is influenced by the target speed.

Furthermore, other desirable features and characteristics of the subject matter described herein will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following figures, wherein like numerals denote like elements, and wherein.

DETAILED DESCRIPTION

Figure 1:
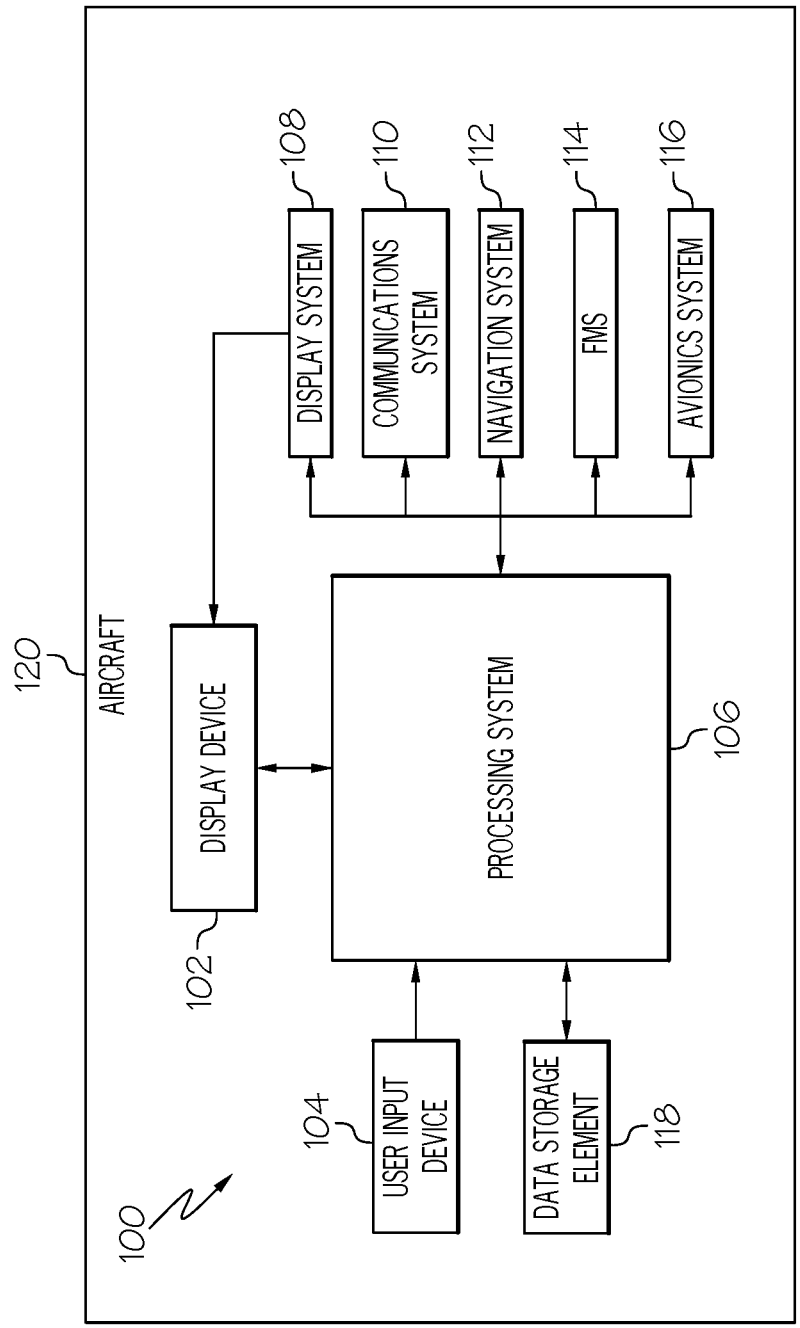
FIG. 1 is a block diagram illustrating an aircraft system in accordance with one or more exemplary embodiments.

The following detailed description is merely exemplary in nature and is not intended to limit the subject matter of the application and uses thereof. Furthermore, there is no intention to be bound by any theory presented in the preceding background, brief summary, or the following detailed description.

Embodiments of the subject matter described herein relate to vehicle management systems and methods for determining a travel profile for autonomous operations in a manner that accounts for travel constraints associated with points within a travel plan as well as cost index targets or desired travel targets within the travel plan. For purposes of explanation, the subject matter is primarily described herein in the context of aircraft flight management systems and methods for determining a speed profile for autonomously operating an aircraft en route to a speed constrained navigational reference point of a flight plan in a manner that accounts for the speed constraints associated with that en route reference point as well as a desired (or targeted) speed, such as a speed based on a desired cost index, cost function, or other optimization criteria. That said, the subject matter described herein is not necessarily limited to aircraft or avionic environments, and in alternative embodiments, may be implemented in an equivalent manner in the context of other types of vehicles and travel plans.

As described in greater detail below in the context of FIGS. 2-3, in exemplary embodiments, a speed envelope region of potential aircraft speeds in advance of a navigational reference point is calculated, determined, or otherwise defined based on the speed constraint associated with the navigational reference point and any other speed constraints in advance of reaching the navigational reference point, such as, for example, a current aircraft speed, speed constraints associated with a preceding navigational reference point, speed constraints associated with travel en route to the navigational reference point, and the like. A boundary of the speed envelope region corresponding to a minimum amount of travel time for reaching the navigational reference point may be calculated or otherwise determined based on the speed constraint associated with the navigational reference point, any maximum aircraft speed constraints en route to the navigational reference point, and the maximum acceleration of the aircraft. Another boundary of the speed envelope region corresponding to a maximum amount of travel time for reaching the navigational reference point may be calculated or otherwise determined based on the speed constraint associated with the navigational reference point, any minimum aircraft speed constraints en route to the navigational reference point, and the maximum acceleration of the aircraft.

Once a speed envelope region in advance of a navigational reference point is defined, one or more desired aircraft speed targets associated with travel in advance of the navigational reference point are identified and utilized to construct or otherwise determine a speed profile that intersects those targeted aircraft speeds within the speed envelope region. The speed profile is then utilized to autonomously operate the aircraft and regulate the aircraft's speed when traveling en route to the navigational reference point.

In accordance with one or more embodiments, the speed profile is calculated or otherwise determined to maximize the duration of time during which the aircraft travels at the targeted speed(s) while en route to the navigational reference point, as described in greater detail below in the context of FIG. 3. In this manner, the amount of time during which the aircraft operates at or near a desired or optimum cost can be maximized while maintaining compliance with other speed constraints. In other embodiments, the speed profile is calculated or otherwise determined to maximize the duration of time during which the average aircraft speed while en route to the navigational reference point is equal to the desired speed(s), as described in greater detail below in the context of FIG. 4. Additionally, in some embodiments, the speed constraints associated with a navigational reference point may be padded in a manner that increases the area of the speed envelope region to increase the duration of time during which the aircraft can operate at or average the targeted speed(s) within the speed envelope region, as described in greater detail below in the context of FIG. 5. In some embodiments, the speed profile may be iteratively determined in conjunction with required time of arrival (RTA) constraints, as described in greater detail below in the context of FIG. 6.

For purposes of explanation, but without limitation, the subject matter may be described herein primarily in the context of a flight management system (FMS) climb speed profile that may be utilized by the autopilot or other automated functionality provided by an FMS to autonomously manage the climb speed of an aircraft during execution of a departure procedure. In this regard, navigational reference points of a departure procedure may be associated with speed constraints requiring a particular aircraft speed to maintain desired separation of aircraft departing from an airport, such as, for example, AT constraints or AT OR ABOVE constraints, which require an aircraft to be traveling at or above a particular speed upon reaching that particular navigational reference point. These constraints may be part of a published or standardized departure procedure, or alternatively, provided by air traffic control (ATC) based on current operations at the airport. The navigational reference points of the departure procedure may be associated with a particular altitude at which the aircraft is required to be at or above during execution of the departure. A cost function may be utilized to identify desired speeds at different altitudes or flight levels within the departure at which the aircraft operates at or best achieves a desired cost index value. Accordingly, the subject matter described herein may be utilize to satisfy AT, AT OR ABOVE, or AT OR BELOW speed constraints while also accounting for operating costs to achieve more cost-efficient operations during an automated departure or climbing phase of flight. That said, the subject matter described herein is not limited to departures or climbs, and may be utilized in an equivalent manner for other aircraft procedures or flight phases, such as, for example, descents, approaches, and the like.

FIG. 1 depicts an exemplary embodiment of a system 100 which may be utilized with a vehicle, such as an aircraft 120. In an exemplary embodiment, the system 100 includes, without limitation, a display device 102, a user input device 104, a processing system 106, a display system 108, a communications system 110, a navigation system 112, a flight management system (FMS) 114, one or more avionics systems 116, and a data storage element 118 suitably configured to support operation of the system 100, as described in greater detail below.

In exemplary embodiments, the display device 102 is realized as an electronic display capable of graphically displaying flight information or other data associated with operation of the aircraft 120 under control of the display system 108 and/or processing system 106. In this regard, the display device 102 is coupled to the display system 108 and the processing system 106, wherein the processing system 106 and the display system 108 are cooperatively configured to display, render, or otherwise convey one or more graphical representations or images associated with operation of the aircraft 120 on the display device 102. The user input device 104 is coupled to the processing system 106, and the user input device 104 and the processing system 106 are cooperatively configured to allow a user (e.g., a pilot, co-pilot, or crew member) to interact with the display device 102 and/or other elements of the system 100, as described in greater detail below. Depending on the embodiment, the user input device 104 may be realized as a keypad, touchpad, keyboard, mouse, touch panel (or touchscreen), joystick, knob, line select key or another suitable device adapted to receive input from a user. In some embodiments, the user input device 104 is realized as an audio input device, such as a microphone, audio transducer, audio sensor, or the like, that is adapted to allow a user to provide audio input to the system 100 in a "hands free" manner without requiring the user to move his or her hands, eyes and/or head to interact with the system 100.

The processing system 106 generally represents the hardware, software, and/or firmware components configured to facilitate communications and/or interaction between the elements of the system 100 and perform additional tasks and/or functions to support operation of the system 100, as described in greater detail below. Depending on the embodiment, the processing system 106 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processing system 106 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 106 includes processing logic that may be configured to carry out the functions, techniques, and processing tasks associated with the operation of the system 100, as described in greater detail below. Furthermore, the steps of a method or algorithm described in connection with the embodiments disclosed herein may be embodied directly in hardware, in firmware, in a software module executed by the processing system 106, or in any practical combination thereof. For example, in one or more embodiments, the processing system 106 includes or otherwise accesses a data storage element (or memory), which may be realized as any sort of non-transitory short or long term storage media capable of storing programming instructions for execution by the processing system 106. The code or other computer-executable programming instructions, when read and executed by the processing system 106, cause the processing system 106 to support or otherwise perform certain tasks, operations, functions, and/or processes described herein.

The display system 108 generally represents the hardware, software, and/or firmware components configured to control the display and/or rendering of one or more navigational maps and/or other displays pertaining to operation of the aircraft 120 and/or onboard systems 110, 112, 114, 116 on the display device 102. In this regard, the display system 108 may access or include one or more databases suitably configured to support operations of the display system 108, such as, for example, a terrain database, an obstacle database, a navigational database, a geopolitical database, a terminal airspace database, a special use airspace database, or other information for rendering and/or displaying navigational maps and/or other content on the display device 102.

In exemplary embodiments, the aircraft system 100 includes a data storage element 118, which contains aircraft procedure information (or instrument procedure information) for a plurality of airports and maintains association between the aircraft procedure information and the corresponding airports. Depending on the embodiment, the data storage element 118 may be physically realized using RAM memory, ROM memory, flash memory, registers, a hard disk, or another suitable data storage medium known in the art or any suitable combination thereof.

As used herein, aircraft procedure information should be understood as a set of operating parameters, constraints, or instructions associated with a particular aircraft action (e.g., approach, departure, arrival, climbing, and the like) that may be undertaken by the aircraft 120 at or in the vicinity of a particular airport. As used herein, an airport should be understood as referring to a location suitable for landing (or arrival) and/or takeoff (or departure) of an aircraft, such as, for example, airports, runways, landing strips, and other suitable landing and/or departure locations, and an aircraft action should be understood as referring to an approach (or landing), an arrival, a departure (or takeoff), an ascent, taxiing, or another aircraft action having associated aircraft procedure information. Each airport may have one or more predefined aircraft procedures associated therewith, wherein the aircraft procedure information for each aircraft procedure at each respective airport may be maintained by the data storage element 118. The aircraft procedure information may be provided by or otherwise obtained from a governmental or regulatory organization, such as, for example, the Federal Aviation Administration in the United States. In an exemplary embodiment, the aircraft procedure information comprises instrument procedure information, such as instrument approach procedures, standard terminal arrival routes, instrument departure procedures, standard instrument departure routes, obstacle departure procedures, or the like, traditionally displayed on a published charts, such as Instrument Approach Procedure (IAP) charts, Standard Terminal Arrival (STAR) charts or Terminal Arrival Area (TAA) charts, Standard Instrument Departure (SID) routes, Departure Procedures (DP), terminal procedures, approach plates, and the like. In exemplary embodiments, the data storage element 118 maintains associations between prescribed operating parameters, constraints, and the like and respective navigational reference points (e.g., waypoints, positional fixes, radio ground stations (VORs, VORTACs, TACANs, and the like), distance measuring equipment, non-directional beacons, or the like) defining the aircraft procedure, such as, for example, altitude minima or maxima, minimum and/or maximum speed constraints, RTA constraints, and the like. It should be noted that although the subject matter is described below in the context of departure procedures and/or climbing procedures for purposes of explanation, the subject matter is not intended to be limited to use with any particular type of aircraft procedure and may be implemented for other aircraft procedures (e.g., approach procedures or en route procedures) in an equivalent manner.

Still referring to FIG. 1, in an exemplary embodiment, the processing system 106 is coupled to the navigation system 112, which is configured to provide real-time navigational data and/or information regarding operation of the aircraft 120. The navigation system 112 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 112, as will be appreciated in the art. The navigation system 112 is capable of obtaining and/or determining the instantaneous position of the aircraft 120, that is, the current (or instantaneous) location of the aircraft 120 (e.g., the current latitude and longitude) and the current (or instantaneous) altitude or above ground level for the aircraft 120. The navigation system 112 is also capable of obtaining or otherwise determining the heading of the aircraft 120 (i.e., the direction the aircraft is traveling in relative to some reference). In the illustrated embodiment, the processing system 106 is also coupled to the communications system 110, which is configured to support communications to and/or from the aircraft 120. For example, the communications system 110 may support communications between the aircraft 120 and air traffic control or another suitable command center or ground location. In this regard, the communications system 110 may be realized using a radio communication system or another suitable data link system.

In an exemplary embodiment, the processing system 106 is also coupled to the FMS 114, which is coupled to the navigation system 112, the communications system 110, and one or more additional avionics systems 116 to support navigation, flight planning, and other aircraft control functions in a conventional manner, as well as to provide real-time data and/or information regarding the operational status of the aircraft 120 to the processing system 106. Although FIG. 1 depicts a single avionics system 116, in practice, the system 100 and/or aircraft 120 will likely include numerous avionics systems for obtaining and/or providing real-time flight-related information that may be displayed on the display device 102 or otherwise provided to a user (e.g., a pilot, a co-pilot, or crew member). For example, practical embodiments of the system 100 and/or aircraft 120 will likely include one or more of the following avionics systems suitably configured to support operation of the aircraft 120: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system.

It should be understood that FIG. 1 is a simplified representation of the system 100 for purposes of explanation and ease of description, and FIG. 1 is not intended to limit the application or scope of the subject matter described herein in any way. It should be appreciated that although FIG. 1 shows the display device 102, the user input device 104, and the processing system 106 as being located onboard the aircraft 120 (e.g., in the cockpit), in practice, one or more of the display device 102, the user input device 104, and/or the processing system 106 may be located outside the aircraft 120 (e.g., on the ground as part of an air traffic control center or another command center) and communicatively coupled to the remaining elements of the system 100 (e.g., via a data link and/or communications system 110). Similarly, in some embodiments, the data storage element 118 may be located outside the aircraft 120 and communicatively coupled to the processing system 106 via a data link and/or communications system 110. Furthermore, practical embodiments of the system 100 and/or aircraft 120 will include numerous other devices and components for providing additional functions and features, as will be appreciated in the art. In this regard, it will be appreciated that although FIG. 1 shows a single display device 102, in practice, additional display devices may be present onboard the aircraft 120. Additionally, it should be noted that in other embodiments, features and/or functionality of processing system 106 described herein can be implemented by or otherwise integrated with the features and/or functionality provided by the FMS 114. In other words, some embodiments may integrate the processing system 106 with the FMS 114. In yet other embodiments, various aspects of the subject matter described herein may be implemented by or at an electronic flight bag (EFB) or similar electronic device that is communicatively coupled to the processing system 106 and/or the FMS 114.

Figure 2:
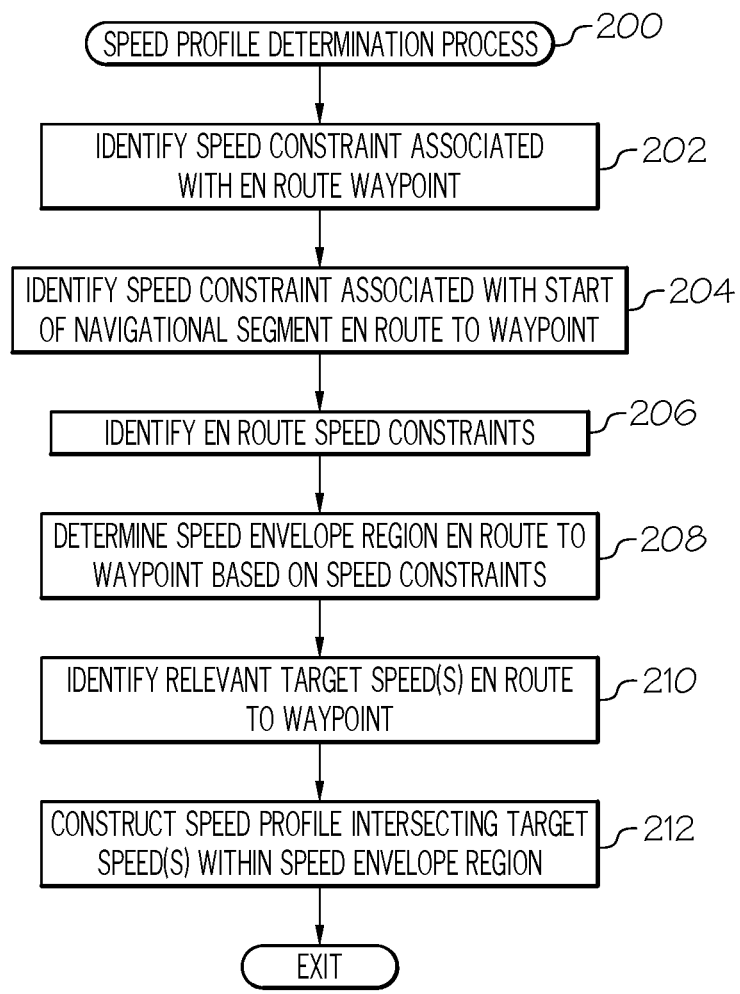
FIG. 2 is a flow diagram illustrating a speed profile determination process suitable for implementation by the aircraft system of FIG. 1 in accordance with one or more exemplary embodiments.

Referring now to FIG. 2, in an exemplary embodiment, an aircraft system is configured to support a speed profile determination process 200 and perform additional tasks, functions, and operations described below. The various tasks performed in connection with the illustrated process 200 may be implemented using hardware, firmware, software executed by processing circuitry, or any combination thereof. For illustrative purposes, the following description may refer to elements mentioned above in connection with FIG. 1. In practice, portions of the speed profile determination process 200 may be performed by different elements of the aircraft system 100. That said, exemplary embodiments are described herein in the context of the speed profile determination process 200 being primarily performed by the processing system 106 and/or FMS 114. It should be appreciated that the speed profile determination process 200 may include any number of additional or alternative tasks, the tasks need not be performed in the illustrated order and/or the tasks may be performed concurrently, and/or the speed profile determination process 200 may be incorporated into a more comprehensive procedure or process having additional functionality not described in detail herein. Moreover, one or more of the tasks shown and described in the context of FIG. 2 could be omitted from a practical embodiment of the speed profile determination process 200 as long as the intended overall functionality remains intact.

For purposes of explanation, the speed profile determination process 200 is described primarily in the context of determining a speed profile optimizing climb speeds for a departure procedure or climbing phase of flight, however, it should be appreciated that the subject matter described herein is not limited to any particular type of procedure or phase of flight. Additionally, for ease of explanation, the speed profile determination process 200 may be described initially in the context of an individual navigational segment; however, as described in greater detail below, in one or more embodiments, the speed profile determination process 200 is iteratively performed across multiple navigational segments of a procedure to cumulatively optimize a speed profile (e.g., maximizing cumulative duration of time spent at or averaging cost-indexed speed targets across an entire procedure) rather than optimizing the speed profile in a piecewise manner (e.g., maximizing duration of time spent at or averaging cost-indexed speed targets within individual navigational segments). Additionally, the speed profile determination process 200 can be periodically and/or continually performed throughout execution of a procedure to dynamically update the speed profile to account for the current speed or status of the aircraft.

Referring to FIG. 2, and with continued reference to FIG. 1, the illustrated speed profile determination process 200 begins by receiving, obtaining or otherwise identifying the speed constraint associated with the destination or en route navigational reference point of a navigational segment (task 202). In this regard, the processing system 106 and/or the FMS 114 identifies the value (or airspeed) associated with the en route waypoint defining the end of a navigational segment and the type of speed constraint associated with that waypoint (e.g., whether the constraint is an AT constraint, an AT OR ABOVE speed constraint, or an AT OR BELOW speed constraint). Depending on the embodiment, the en route waypoint speed constraint may be identified or obtained from the procedure information stored in the data storage element 118, from ATC (e.g., via communications system 110), or from a pilot or other user (e.g., via user input device 104).

Additionally, the speed profile determination process 200 receives, obtains or otherwise identifies the speed constraint associated with the start of the navigational segment en route to that speed-constrained navigational reference point (task 204). Similar to the en route waypoint, the processing system 106 and/or the FMS 114 identifies the value (or airspeed) associated with the preceding waypoint defining the start of the navigational segment of interest and the type of speed constraint associated with that waypoint (e.g., whether the constraint is an AT constraint, an AT OR ABOVE speed constraint, or an AT OR BELOW speed constraint). Again, depending on the embodiment, the preceding waypoint speed constraint may be identified or obtained from the procedure information stored in the data storage element 118, from ATC, or from a pilot or other user. If the preceding waypoint does not have an associated speed constraint, the processing system 106 and/or the FMS 114 may identify the current or anticipated airspeed at that preceding waypoint as the speed constraint associated with the start of the navigational segment.

The speed profile determination process 200 also receives, obtains or otherwise identifies the speed constraints associated with traversing the navigational segment en route to the speed-constrained navigational reference point (task 206). In this regard, the processing system 106 and/or the FMS 114 identifies any minimum or maximum airspeed values for the period of travel en route to the speed-constrained waypoint. Again, depending on the embodiment, the preceding waypoint speed constraint may be identified or obtained from the procedure information stored in the data storage element 118, from ATC, or from a pilot or other user. In some embodiments, the minimum or maximum airspeed values may be determined based on aircraft capabilities, and may be calculated in real-time based on the predicted aircraft weight, altitude, airspeed, meteorological conditions, and/or other factors while en route to the waypoint.

After identifying speed constraints associated with traveling a navigational segment from a starting location to a speed-constrained navigational reference point, the speed profile determination process 200 calculates or otherwise determines a speed envelope region that is bounded by one or more of the speed constraints (task 208). In this regard, in one or more exemplary embodiments, the speed envelope region represents the potential range of airspeeds achievable by the aircraft (e.g., based on the maximum aircraft acceleration/deceleration capabilities) at various locations along the navigational segment en route to the speed-constrained waypoint without violating the speed constraints. That said, as described in greater detail below in the context of FIG. 5, in some embodiments, the speed constraints associated with one or more waypoints may be padded or loosened, such that the speed envelope region represents the potential range of airspeeds achievable by the aircraft without violating the speed constraints associated with the endpoints of a navigational segment by more than a threshold amount.

In exemplary embodiments, the processing system 106 and/or the FMS 114 determines the speed envelope region by calculating or otherwise determining a first boundary corresponding to the minimum amount of travel time for traversing the navigational segment en route to the speed-constrained waypoint and an opposing boundary corresponding to the maximum amount of travel time for traversing the navigational segment. The minimum travel time boundary generally starts from a maximum allowable or achievable speed value at the initial reference point defining the navigational segment and assumes a maximum acceleration of the aircraft until reaching any maximum airspeed constraints and traveling at those maximum airspeeds for a maximum duration of time until reaching the speed-constrained waypoint with a maximum airspeed that satisfies the waypoint's associated speed constraint. In this regard, if any maximum airspeed constraint exceeds the waypoint's associated speed constraint, the minimum travel time boundary may assume a maximum deceleration from such maximum airspeed values down to the waypoint's associated speed constraint or other subsequent speed constraints. Conversely, the maximum travel time boundary generally starts from a minimum allowable or achievable speed value at the initial reference point defining the navigational segment maximizes the duration of travel at the minimum airspeed until accelerating at the maximum acceleration of the aircraft until reaching the next minimum airspeed constraint en route to or at the speed-constrained waypoint.

Figure 3:
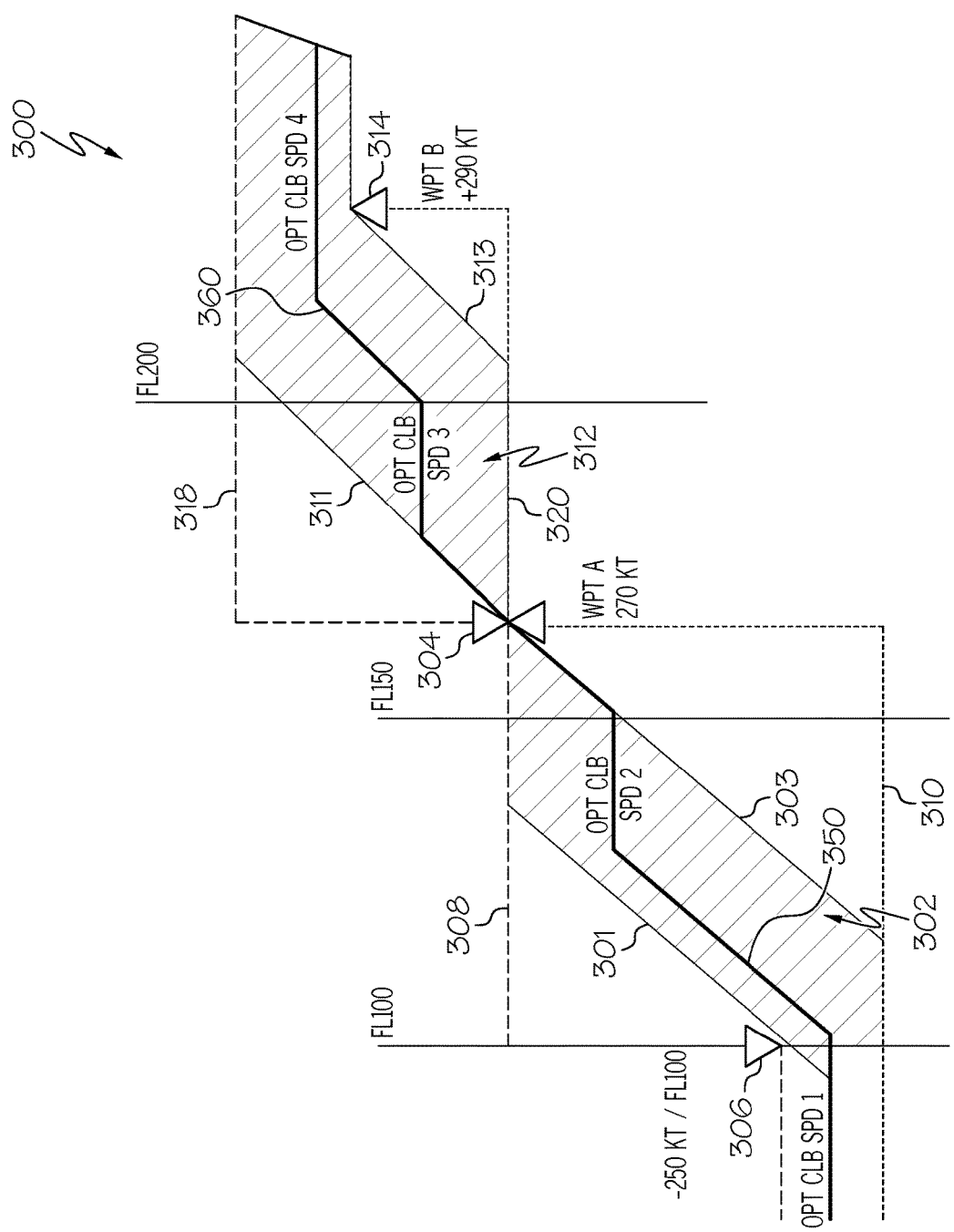
FIGS. 3-4 are graphs depicting exemplary speed profiles with respect to flight level that may be generated by the speed profile determination process in accordance with one or more exemplary embodiments.

FIG. 3 depicts a graph 300 of airspeeds with respect to flight level for an exemplary climb speed profile associated with a departure procedure. With reference to FIGS. 1-2, FIG. 3 depicts a speed envelope region 302 that may be determined by the processing system 106 and/or the FMS 114 for climbing from an initial AT OR BELOW speed constraint 306 (e.g., AT OR BELOW 250 knots) associated with a start of a navigational segment to an AT speed constraint 304 (e.g., AT 270 knots) associated with a waypoint defining the end of the navigational segment. In this regard, the processing system 106 and/or the FMS 114 calculates a minimum travel time boundary 301 for the speed envelope region 302 that starts at the maximum airspeed that satisfies the speed constraint associated with the initial waypoint of the navigational segment (e.g., the value for the AT OR BELOW speed constraint 306) and accelerates at the maximum acceleration of the aircraft while en route between waypoints (which may be determined based on predicted aircraft weight, altitude level, meteorological conditions, engine status, and/or potentially other factors) before reaching a maximum airspeed constraint 308 associated with travel en route to the waypoint at the end of the navigational segment, and then maximizing the duration of time traveled at the maximum airspeed constraint 308 before arriving at the maximum airspeed at the en route waypoint that satisfies its associated constraint (e.g., the value for the AT speed constraint 304). Conversely, the maximum travel time boundary 303 for the speed envelope region 302 may start at the minimum airspeed that satisfies the initial waypoint speed constraint 306 and/or the minimum airspeed constraint 310 associated with travel within the navigational segment for the maximum duration of time that allows the airspeed to satisfy the en route waypoint speed constraint 304 given the maximum acceleration of the aircraft while en route.

Similarly, the processing system 106 and/or the FMS 114 may determine a subsequent speed envelope region 312 for climbing from the AT speed constraint 304 to the next successive waypoint having an associated AT OR ABOVE speed constraint 314 (e.g., AT OR ABOVE 290 knots). The minimum travel time boundary 311 for the speed envelope region 312 that starts at the maximum airspeed satisfying the initial constraint 304 (e.g., the value for the AT speed constraint 304) and accelerates at the maximum acceleration of the aircraft while en route until reaching a maximum airspeed constraint 318 associated with that navigational segment, and then maximizing the duration of time traveled at the maximum airspeed constraint 308 before arriving at the maximum airspeed at the en route waypoint that satisfies the AT OR ABOVE speed constraint 314 (which is equal to the maximum airspeed constraint 318). The maximum travel time boundary 313 for the speed envelope region 312 starts at the minimum airspeed that satisfies the initial speed constraint 304 (e.g., the value of the AT speed constraint 304) and then attempts to travel at the minimum speed constraint 320 associated with the navigational segment for the maximum duration of time that allows the airspeed to satisfy the value of the AT OR ABOVE speed constraint 314 upon reaching that waypoint at the end of the segment given the maximum acceleration capability of the aircraft.

Referring again to FIG. 2, after determining a speed envelope region for a particular navigational segment, the speed profile determination process 200 receives, obtains or otherwise identifies any desired or target airspeeds relevant to the navigational segment and then constructs or otherwise determines a speed profile within the speed envelope region that intersects the targeted speed(s) (tasks 210, 212). In an exemplary embodiment, the targeted airspeeds are calculated or otherwise determined by the processing system 106 and/or the FMS 114 at particular flight levels or altitudes based on an input cost index value and current or predicted aircraft status information. For example, a pilot or other user may utilize the user input device 104 to provide a desired cost index value, which, in turn, is utilized by the processing system 106 and/or the FMS 114 to determine a targeted airspeed (or optimum speed) associated with a particular flight level (or range thereof) that achieves the input cost index value based on a variety of factors, as will be understood to those skilled in the art and the details of which are not germane to the subject matter described herein. That said, in other embodiments, a pilot or other user may utilize the user input device 104 to input or otherwise provide desired airspeeds for use at particular flight levels in lieu of or in addition to those determined using a cost index value or cost function.

Once the target airspeed(s) for a navigational segment are identified, the processing system 106 and/or the FMS 114 constructs a speed profile within the speed envelope region for that navigational segment that intersects the targeted airspeed(s). In one or more exemplary embodiments, the processing system 106 and/or the FMS 114 constructs a speed profile that maximizes an amount of travel at a targeted airspeed within the navigational segment, as illustrated in FIG. 3. In alternative embodiments, the processing system 106 and/or the FMS 114 constructs a speed profile that maximizes an amount of travel over which the average airspeed is equal to a targeted airspeed, as illustrated in FIG. 4.

Referring first to FIG. 3, based on the input cost index value, the processing system 106 and/or the FMS 114 calculates or otherwise determines a first target airspeed (or optimum climb speed) up to reaching flight level 100 (FL100) equal to OPT CLB SPD 1, a second target airspeed up to reaching FL150 equal to OPT CLB SPD 2, a third target airspeed up to reaching FL200 equal to OPT CLB SPD 3, and a fourth target airspeed up to reaching FL250 equal to OPT CLB SPD 4. For the first navigational segment for climbing from the AT OR BELOW speed constraint 306 to the AT speed constraint 304, the processing system 106 and/or the FMS 114 constructs a speed profile 350 within the speed envelope region 302 that has a combination of differently sloped portions configured to maximize the duration of time at which the airspeed is equal to either OPT CLB SPD 1 or OPT CLB SPD 2. In particular, the processing system 106 and/or the FMS 114 may construct the speed profile 350 to maximize the duration of time the airspeed is equal to OPT CLB SPD 1 until the aircraft altitude is expected to reach FL100, and then increase with a slope corresponding to a maximum allowable acceleration of the aircraft until reaching OPT CLB SPD 2 to maximize the duration of time the airspeed is equal to OPT CLB SPD 2 before the aircraft altitude reaches FL150, and then increase with a slope corresponding to the maximum acceleration to satisfy the AT speed constraint 304. In this regard, if the constructed profile 350 were to reach the maximum travel time boundary 303 prior to FL150 (e.g., due to a higher value for the AT speed constraint 304), the speed profile 350 would begin accelerating at the maximum acceleration prior to reaching FL150 to ensure the AT constraint 304 is satisfied. For the following segment between the AT constraint 304 and the AT OR ABOVE constraint 314, the processing system 106 and/or the FMS 114 constructs a speed profile 360 within the speed envelope region 312 that accelerates with the maximum acceleration along the minimum travel time boundary 311 until reaching the targeted airspeed up to FL200 and then remains at OPT CLB SPD 3 until reaching FL200 and then accelerating with the maximum acceleration until reaching the next targeted airspeed (OPT CLB SPD 4) and then maximizing the duration of time at that target value.

Referring to FIGS. 2-3, it should be noted that the speed profile determination process 200 allows for maximizing the total amount of flight time spent at one of the multiple different optimum climb speeds calculated by the FMS 114 for multiple different flight levels or operating regions. Thus, a climb, descent, or other procedure may be subdivided into any number of regions or segments, which, in turn, could each be associated with a particular optimum speed associated therewith, with the speed profile determination process 200 being utilized to maximize the cumulative amount of time the aircraft is flying at one of the optimum speeds within the respective operating regions or segments.

Figure 4:
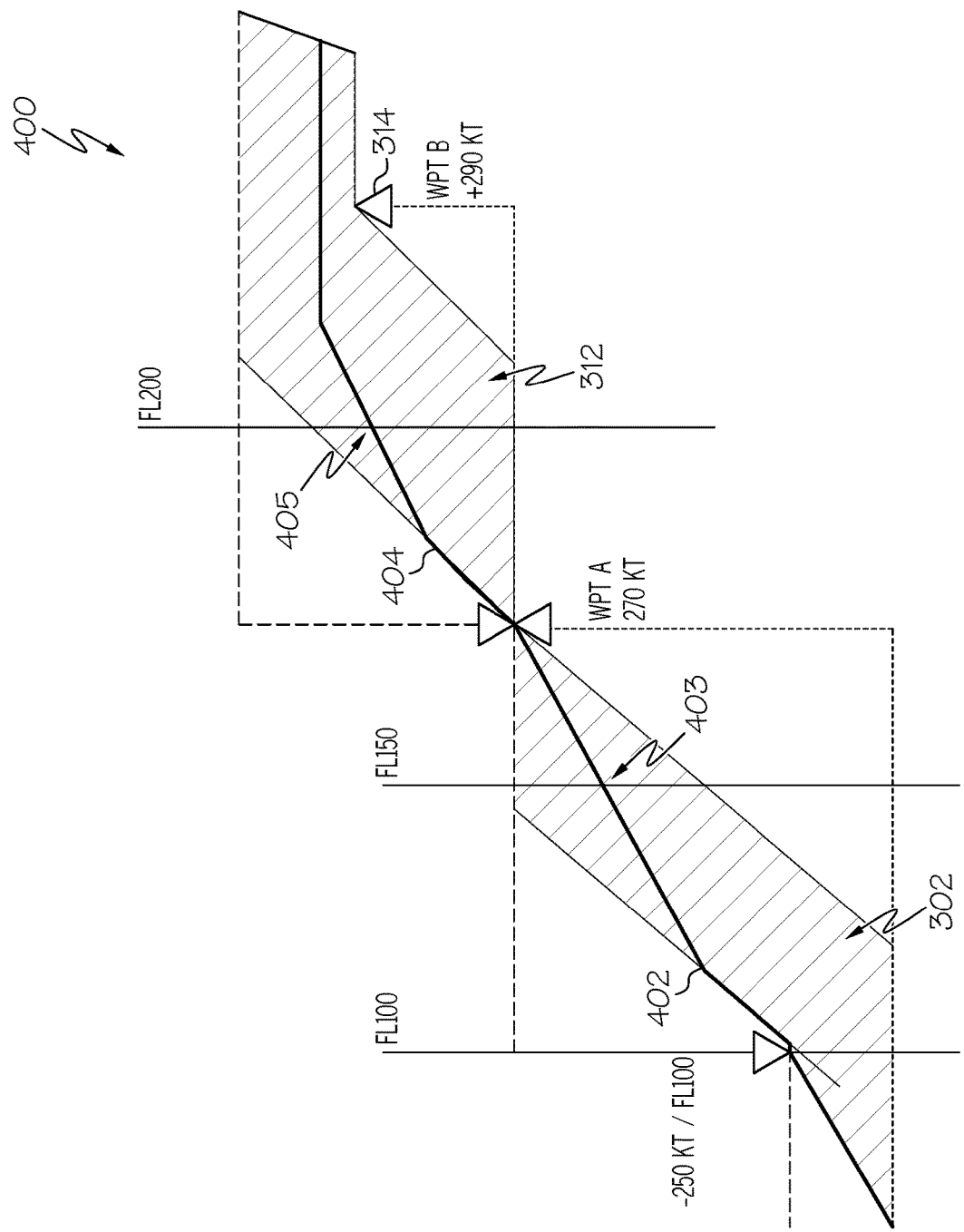

FIG. 4 depicts an alternative embodiment for constructing speed profiles 402, 404 within speed envelope regions 302, 312. In this regard, FIG. 4 depicts a graph 400 where the constructed speed profile attempts to maximize the duration of time when the aircraft is continuously accelerating during a climb to achieve a smoother climb. For speed envelope region 302, rather than maximizing a duration of time that the airspeed is equal to OPT CLB SPD 2, speed profile 402 is constructed to maximize a duration of time over which the average airspeed is equal to OPT CLB SPD 2 by including a linearly sloped portion 403 having an average value equal to OPT CLB SPD 2. The linearly sloped portion 403 intersects OPT CLB SPD 2 at its associated flight level (FL150), and the slope of the portion 403 is minimized to maximize the duration of time the average value is equal to OPT CLB SPD 2. In this regard, for a subsequent AT or AT OR ABOVE speed constraint, the slope of the portion 403 may be determined by constructing a line through the target speed (OPT CLB SPD 2) an the minimum airspeed value that satisfies such subsequent speed constraints, thereby minimizing the slope of the portion 403. Prior to reaching the sloped portion 403 with an average value equal to a target speed value, the processing system 106 and/or the FMS 114 constructs the speed profile 402 with a maximum acceleration, to thereby maximize the duration of the sloped portion 403 within the speed envelope region 302. Similarly, for speed envelope region 312, in the embodiment of FIG. 4, the processing system 106 and/or the FMS 114 constructs a speed profile 404 that accelerates with the maximum acceleration until reaching a sloped portion 405 configured to maximize a duration of time that the average climb speed is equal to the optimum climb speed associated with FL200 (OPT CLB SPD 3) before reaching the optimum climb speed associated with FL250 (OPT CLB SPD 4) and satisfying the AT OR ABOVE constraint 314.

Referring again to FIG. 2, in accordance with one or more embodiments, the speed profile determination process 200 is iteratively performed across multiple navigational segments of a procedure to cumulatively maximize the duration of time when the aircraft is flying at a targeted speed during the procedure, or alternatively, the duration of time when the average speed of the aircraft is equal to a targeted speed. For example, navigational segments bounded by AT OR ABOVE or AT OR BELOW speed constraints have a range of acceptable speeds upon reaching those waypoints. Accordingly, the speed profile determination process 200 may be iteratively performed to increase or decrease speed values at the endpoints of navigational segments (and then update the portion of the speed profile corresponding to that navigational segment accordingly) to arrive at a solution consisting of sets of speed profiles across the multiple navigational segments that optimizes the aircraft speed relative to the cost index across execution of the entire procedure. For example, a speed profile through the speed envelope region 302 that starts at the maximum speed for the AT OR BELOW speed constraint 306 rather than OPT CLB SPD 1 may reduce the duration of time the aircraft travels at (or averages) OPT CLB SPD 1 below FL100 but increase the duration of time the aircraft travels at (or averages) OPT CLB SPD 2, thereby optimizing the aircraft speed across those two segments. Additionally, as described in greater detail below in the context of FIG. 6, the speed profile determination process 200 could be iteratively performed to account for RTA constraints and arrive at an optimal speed profile that also satisfies RTA constraints in addition to speed constraints.

Moreover, in some embodiments, the speed profile determination process 200 is periodically performed or otherwise updated during flight to dynamically update the speed profile as the aircraft travels within a navigational segment, to thereby further optimize the speed profile. In this regard, the current aircraft altitude may be treated as the initial navigational reference point of a navigational segment currently being flown with the current aircraft speed being treated as an AT speed constraint associated with that starting point. Thus, as the aircraft deviates from a previously constructed speed profile, the processing system 106 and/or the FMS 114 may dynamically update the speed profile to be used to optimize the speed profile based on the current aircraft status.

Figure 5:
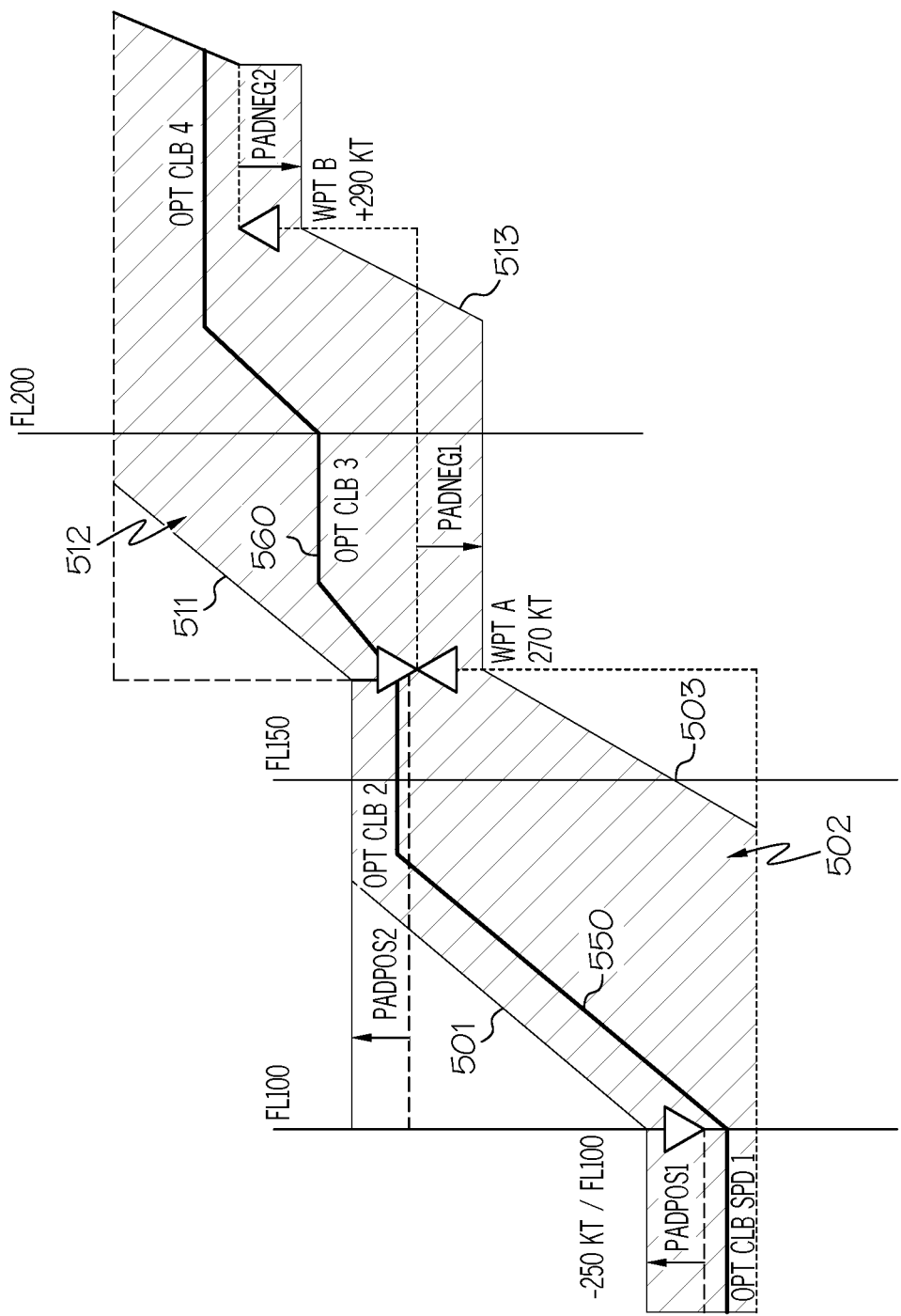
FIG. 5 is a graph depicted an exemplary speed profile with respect to flight level that may be generated by the speed profile determination process using padded speed constraints in accordance with one or more exemplary embodiments.

Referring now to FIG. 5, in accordance with one or more embodiments, speed constraints are padded or relaxed to allow for construction of speed profiles that maximize duration of time the aircraft travels at (or averages) a targeted airspeed. For example, AT OR BELOW constraints (e.g., constraint 306) may be padded upward, and AT OR ABOVE constraints (e.g., constraint 314) may be padded downward, while AT constraints (e.g., constraint 304) may be padded upward and/or downward to accommodate targeted airspeeds while satisfying the speed constraints within some threshold margin. In one or more embodiments, the constraints are padded independently by an amount that is less than or equal to some maximum allowable padding value (e.g., plus or minus 10 knots), but the cumulative amount of padding throughout the procedure is equal to zero (e.g., the sum of all upward padding minus the sum of all downward padding is equal to zero). For example, the AT OR BELOW constraint 306 may be increased by an amount (PadPos1) to relax the speeds up its associated waypoint at FL100. The AT constraint 304 may be increased by a different amount (PadPos2) for purposes of constructing the minimum travel time boundary 501 for a padded speed envelope region 502, while decreased by an amount (PadNeg1) for purposes of constructing the maximum travel time boundary 503 for the padded speed envelope region 502. The AT OR ABOVE constraint 314 may be decreased by a different amount (PadNeg2) for purposes of constructing the maximum travel time boundary 513 for padded speed envelope region 512, while the minimum travel time boundary 511 for the padded speed envelope region 512 is constructed using the upwardly padded AT constraint 304 (e.g., the AT speed constraint plus PadPos2).

In exemplary embodiments, the sum of the positive padding is equal to the negative padding (e.g., PadPos1+PadPos2=PadNeg1+PadNeg2). Each of the padding amounts is less than a maximum allowable padding value (e.g., 10 knots). In one or more embodiments, the padding amounts for different constraints may be different from one another to better optimize the cumulative speed profile across the procedure, without violating the maximum allowable padding value and maintaining a net padding value equal to zero. That said, in some embodiments, the amount of padding may be net positive or net negative to accommodate RTA constraints, as described in greater detail below in the context of FIG. 6.

Still referring to FIG. 5, the speed profile determination process 200 may construct speed profiles through the padded speed envelope regions in a similar manner as described above. In this regard, when the target speed for up to FL150 (OPT CLB 2) is greater than the speed value associated with the AT constraint 304 (e.g., greater than 270 knots) by less than the maximum padding value, the constructed speed profile 550 proceeds with maximum acceleration until reaching the target speed associated with FL150 and then maintains the airspeed at that OPT CLB 2 value to maximize the duration of time at the target speed value without increasing the deviation from the original AT speed constraint 304. The subsequent speed profile segment 560 may be constructed with maximum acceleration from the FL150 target speed to the target speed associated with FL200 (e.g., OPT CLB 3). By virtue of the padding and increased speed at the start of the speed profile segment 560, the target speed associated with FL200 may be reached sooner, thereby further increasing the duration of time that the aircraft flies at a targeted airspeed during the climb.

Figure 6:
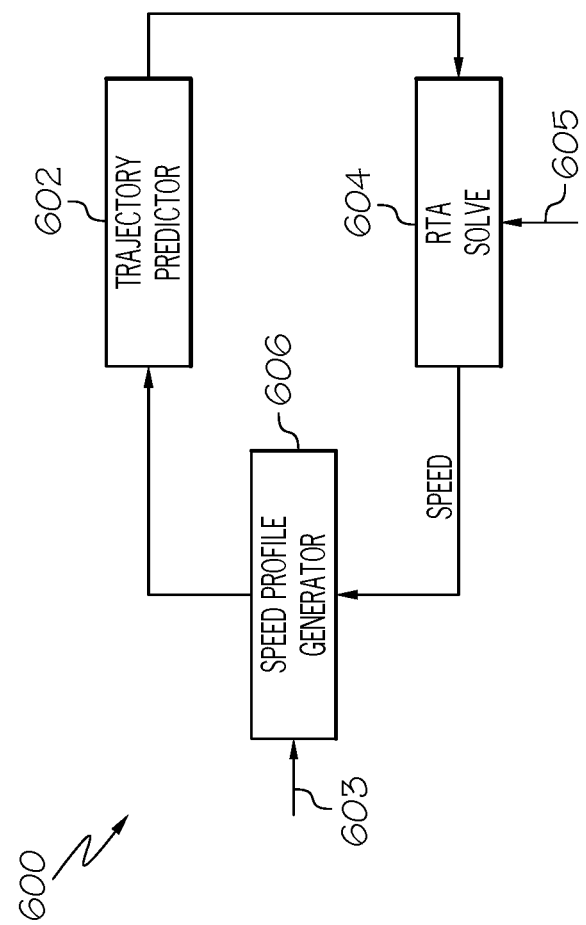
FIG. 6 is a block diagram of a required time of arrival (RTA) management system suitable for implementation with the speed profile determination process of FIG. 2 in accordance with one or more exemplary embodiments.

Referring now to FIG. 6, in accordance with one or more embodiments, the speed profile determination process 200 is implemented by a speed profile generator 602 as part of a RTA management system 600 (which may be implemented by the processing system 106 and/or the FMS 114). The speed profile generator 602 receives or otherwise obtains various speed constraints 601 associated with a procedure (e.g., tasks 202, 204, 206) and generates an initial speed profile 603 based on those speed constraints and various targeted or desired airspeeds applicable to execution of the procedure. A trajectory predictor 604 receives the speed profile output by the speed profile generator 602 and computes one or more estimated times of arrival (ETAs) 605 based on the speed profile. The ETAs 605 are provided to an RTA solver 606 which compares the ETAs 605 to one or more corresponding RTAs 607 and determines a speed adjustment 609 based on any differences.

The speed adjustment 609 is then utilized by the speed profile generator 602 to adjust the speed profile 603 in a manner that reduces the time difference (or error) between the ETA(s) 605 and the RTA(s) 607. In this regard, the speed profile generator 602 may adaptively pad AT or AT OR ABOVE speed constraints lower to delay the ETAs 605 in response to downward speed adjustments 609, and conversely, adaptively pad AT or AT OR BELOW speed constraints higher to advance the ETAs 605 in response to upward speed adjustments 609. Additionally, in one or more embodiments, the speed profile generator 602 may vary the manner in which the speed profile is optimized (e.g., maximizing duration at targeted speeds versus maximizing duration of average speed equal to targeted speeds) based on the requested speed adjustment 609. The updated speed profile 603 may then be provided to the trajectory predictor 604 for updating the ETAs 605, and so on, to iteratively reduce the speed adjustment 609.

Referring again to FIGS. 1-2, the subject matter described herein allows for the processing system 106 and/or the FMS 114 to generate a speed profile that accounts for speed constraints associated with a procedure while also attempting to achieve a desired cost index by accounting for different targeted speeds. For example, multiple different optimum climb speeds associated with different flight levels (or ranges thereof) may be accounted for when constructing a speed profile for a departure procedure having one or more AT or AT OR ABOVE speed constraints. The resulting speed profile may be utilized by the FMS 114 (or another autopilot, autothrottle or flight guidance subsystem) to autonomously operate the aircraft while climbing to best achieve the desired cost index, thereby facilitating cost-efficient operations while attempting to comply with various speed constraints, RTA constraints, and the like. In various embodiments, the processing system 106 and/or the FMS 114 may also generate or otherwise provide a graphical representation of the speed profile on the display device 102 to thereby allow a pilot to manually fly the aircraft in a cost effective manner while attempting to manage aircraft speed and arrival times.

For the sake of brevity, conventional techniques related to autopilot, flight management, route planning and/or navigation, aircraft procedures, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A computer-implemented method of operating a vehicle, the method comprising:

identifying a first speed constraint associated with a navigational reference point;

identifying a second speed constraint associated with a second navigational reference point preceding the navigational reference point;

identifying a maximum speed between the navigational reference point and the second navigational reference point;

identifying a minimum speed between the navigational reference point and the second navigational reference point;

determining a speed envelope region en route to the navigational reference point based at least in part on the first speed constraint and a maximum acceleration of the vehicle, wherein determining the speed envelope region comprises:

determining a minimum travel time boundary for the speed envelope region between the navigational reference point and the second navigational reference point based at least in part on the first speed constraint, the second speed constraint, the maximum acceleration of the vehicle, and the maximum speed between the navigational reference point and the second navigational reference point; and determining a maximum travel time boundary for the speed envelope region based at least in part on the first speed constraint, the second speed constraint, the maximum acceleration of the vehicle, and the minimum speed between the navigational reference point and the second navigational reference point;

identifying a target speed en route to the navigational reference point;
determining a speed profile for travel en route to the navigational reference point within the speed envelope region, wherein the speed profile intersects the target speed within the speed envelope region and a slope of the speed profile is influenced by the target speed; and
autonomously operating the vehicle in accordance with the speed profile.

2. The method of claim 1, further comprising padding at least one of the first speed constraint and the second speed constraint based on the target speed.

3. The method of claim 1, wherein the slope of the speed profile maximizes a duration of time when a speed of the vehicle is equal to the target speed.

4. The method of claim 1, wherein the slope of the speed profile maximizes a duration of time when an average speed of the vehicle is equal to the target speed.

5. The method of claim 1, further comprising identifying a second target speed en route to the navigational reference point, wherein determining the speed profile comprises determining the speed profile intersecting the target speed and the second target speed within the speed envelope region.

6. The method of claim 5, wherein the slope of the speed profile maximizes a cumulative duration of time a speed of the vehicle is equal to one of the target speed and the second target speed.

7. The method of claim 5, wherein the slope of the speed profile maximizes a duration of time when an average speed of the vehicle is equal to one of the target speed and the second target speed.

8. The method of claim 1, further comprising determining the target speed based on a cost index value.

9. The method of claim 1, further comprising:
identifying a second speed constraint associated with a third navigational reference point;
determining a second speed envelope region between the navigational reference point and the third navigational reference point based at least in part on the first speed constraint, the second speed constraint, and the maximum acceleration of the vehicle;
identifying a second target speed en route to the third navigational reference point, wherein:
determining the speed profile comprises determining the speed profile for travel from the navigational reference point to the third navigational reference point within the second speed envelope region; and
the speed profile intersects the second target speed within the second speed envelope region and a second slope of the speed profile within the second speed envelope region is influenced by the second target speed.

10. The method of claim 1, wherein:
the target speed is an optimum speed associated with a first flight level below a second flight level associated with the navigational reference point.

11. A method of operating an aircraft, the method comprising:
identifying, by a flight management system (FMS) onboard the aircraft, one of an AT speed constraint and an AT OR ABOVE speed constraint associated with a navigational reference point of a flight plan;
determining, by the FMS, a speed envelope region in advance of the navigational reference point based at least in part on a maximum acceleration of the aircraft and the one of the AT speed constraint and the AT OR ABOVE speed constraint;
identifying, by the FMS, a target speed en route to the navigational reference point;
determining, by the FMS, a speed profile that intersects the target speed within the speed envelope region, wherein a slope of the speed profile is influenced by the target speed; and
autonomously operating the aircraft in accordance with the speed profile.

12. The method of claim 11, wherein determining the speed profile comprises determining the speed profile that maximizes a duration of time when a speed of the aircraft is equal to the target speed.

13. The method of claim 11, wherein determining the speed profile comprises determining the speed profile that maximizes a duration of time when an average speed of the aircraft is equal to the target speed.

14. The method of claim 11, wherein determining the speed envelope region comprises padding the one of the AT speed constraint and the AT OR ABOVE speed constraint based on the target speed.

15. The method of claim 11, wherein identifying the target speed comprises the FMS determining the target speed based on a cost index value and a flight level en route to the navigational reference point.

16. The method of claim 11, wherein:
identifying the one of the AT speed constraint and the AT OR ABOVE speed constraint comprises identifying the one of the AT speed constraint and the AT OR ABOVE speed constraint based on a departure procedure associated with an airport; and
identifying the target speed comprises the FMS determining an optimum climb speed associated with a first flight level below a second flight level associated with the navigational reference point based on a cost index value, wherein the speed profile intersects the optimum climb speed.

17. An aircraft system comprising:
a data storage element maintaining procedure information associated with an aircraft action, wherein the procedure information includes a navigational reference point having a speed constraint associated therewith;
an input device to receive a cost index; and
a processing system coupled to the data storage element and the input device to determine a speed envelope region en route to the navigational reference point based at least in part on the speed constraint, identify a target speed comprising an optimum speed associated with a first flight level below a second flight level associated with the navigational reference point corresponding to the cost index, determine a speed profile intersecting the target speed within the speed envelope region, and autonomously operating an aircraft in accordance with the speed profile, wherein a slope of the speed profile is influenced by the target speed.

18. The aircraft system of claim 17, wherein the slope maximizes a duration of time when a speed of the aircraft is equal to the target speed.

19. The aircraft system of claim 17, wherein the slope maximizes a duration of time when an average speed of the aircraft is equal to the target speed.

* * * * *